INVENTOR
FRANCIS R. RAUSCH
BY William N. Barrett
ATTORNEY

Nov. 12, 1968 F. R. RAUSCH 3,411,144

INPUT-OUTPUT APPARATUS

Filed April 26, 1966 3 Sheets-Sheet 3

United States Patent Office 3,411,144
Patented Nov. 12, 1968

3,411,144

INPUT-OUTPUT APPARATUS

Francis R. Rausch, Vestal, N.Y., assignor to International Business Machines Corporation, Armonk, N.Y., a corporation of New York Filed Apr. 26, 1966, Ser. No. 545,506
6 Claims. (Cl. 340—172.5)

ABSTRACT OF THE DISCLOSURE

Data communications between peripheral units and a central processor are controlled by an address register and a count register, the former selecting from the processor storage unit the first in a series of bytes of information to be transferred while the count register determines the number of bytes involved in the series. A plurality of signal lines are enabled to transfer the information under control of an auxiliary channel clock while the processor clock is disabled.

The present invention is directed to an input-output channel for a data processing machine and specifically an input-output channel particularly adapted for high speed operations with a data processor utilizing micro-instruction control.

In the transfer of data between a central processing unit containing an addressable storage facility and a peripheral unit such as, for example a tape unit, there are several control requirements which include the selection of the required peripheral unit for data transfer, the selection of the locations in the storage facility between which data is to be transferred, and the control over the quantity of data to be transferred.

The transfer of data can be conveniently made by allowing the I/O channel to secure control over the addressing function in the central storage facility in preference to the address requirements of the program being handled simultaneously by the processor. Since the peripheral data rate is ordinarily considerably slower than the processor data rate, the transfer of data between peripheral unit and processor can be achieved without interruption of the main program of the processor. The data transfer is thus one of appropriating "cycles of machine operation" as required.

The present invention is directed to improvements in the described type of data transfer. The improvement is in the minimization of the apparatus required to perform the necessary functions while providing apparatus for effecting a maximum data transfer rate between peripheral devices and data processors utilizing a microinstruction control.

While in the following specification there will be a more specific general description of a data processor as above described, this type of processor utilizes a series of microinstructions for each functional operation the processor will be required to perform where an instruction controls the basic elements of the processor (registers, storage, data flow paths, etc.) during each basic operating cycle of the processor.

The results of each basic operating cycle can be utilized to selectively address the next microinstruction. Thus, instead of providing a fixed logic wired for each functional operation, there is provided a series of sequential control words with sub-sequences which are selected from immediately preceding conditions within the processor.

While there are many differences in characteristic between this type processor and processors utilizing fixed logic, the characteristic most germane to the present invention is that the micro-instruction control is, because of its serial nature and dependence on detection of conditions by serial sampling, inherently slower in decision-making than would be a logic circuit making a decision on parallel input.

Applicant, thus to provide a high speed data transfer between peripheral unit and data processor, has provided a fixed logic circuit. As a part of this logical circuit, applicant has incorporated as one of the inventive features thereof, a timing pulse generator which is operated in response to a request by the peripheral device to effect a data transfer operation. As will become quite apparent in the detailed description, this timing pulse generator brought into operation by the request of the peripheral unit provides significant advantages in the logical implementation of the channel apparatus. In combination with a timing pulse generator individual to the processor it has been found feasible to operate selectively to transfer certain commands to the channel utilizing timings individual to the processor from where these commands originate while using with the same logic implementation a timing pulse generator to transfer data between the storage facility and the peripheral unit.

With this broad over-all advantage, there has been in the logic implementation a substantial reduction in the amount of apparatus required.

It is therefore an object of this invention to provide an input-output channel for effecting high speed data transfer.

It is a further object of this invention to provide an input-output channel for effecting high speed data transfer in which data transfer is selectively controlled by either processor or peripheral device.

Another object of the present invention is to provide means within the data channel to effect transfer of data under the control of either timings being generated within the channel or within the processor.

Still another object of the present invention is to provide means within the channel for effecting data transfer wherein these means can be utilized to perform a plurality of functions.

The foregoing and other objects, features and advantages of the invention will be apparent from the following more particular description of a preferred embodiment of the invention, as illustrated in the accompanying drawings.

Figure 1:
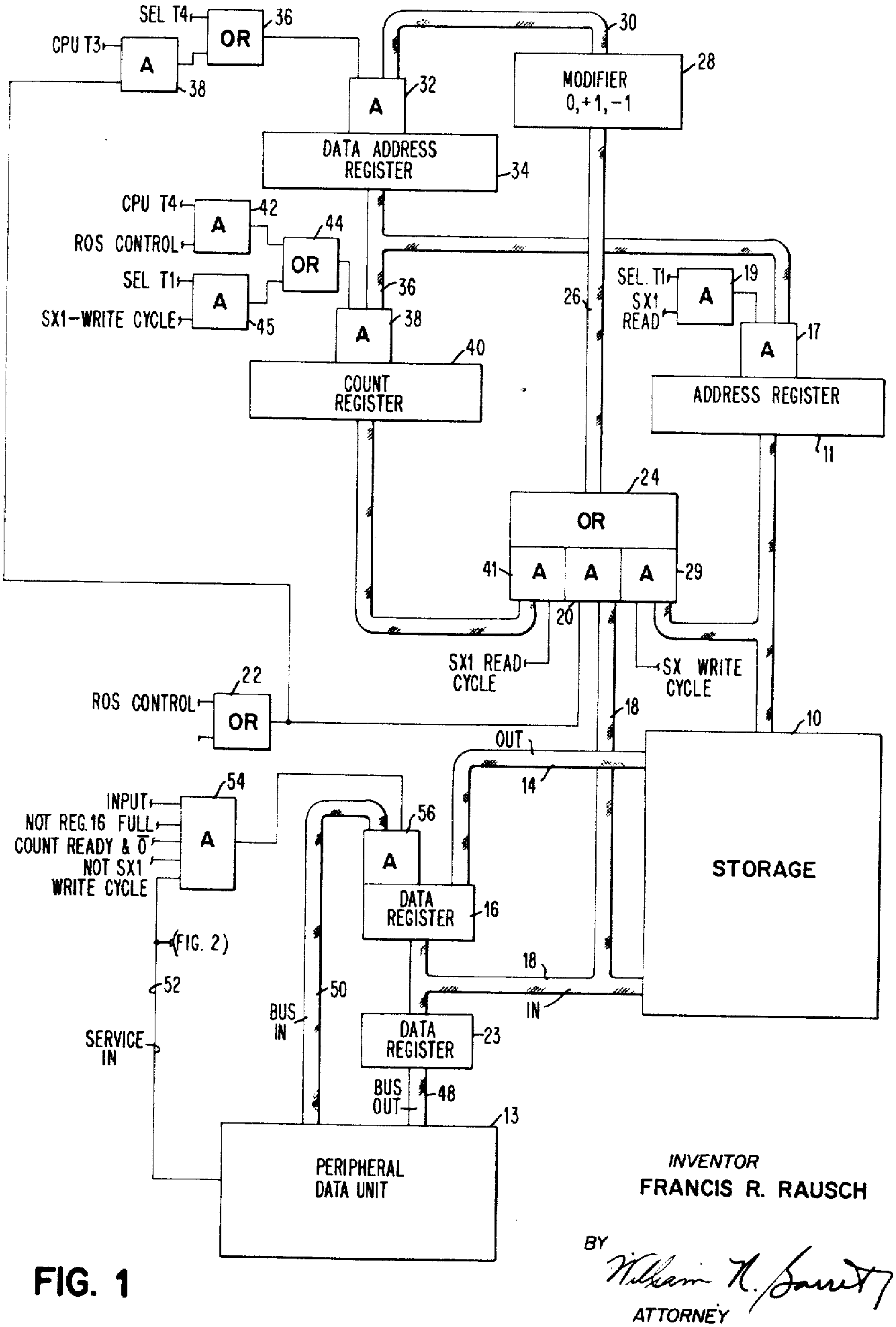
FIG. 1 is a schematic illustration of a portion of the control and data flow for the data channel and processor.

The central processing unit which forms a portion of the present invention contains a main storage to which data from an I/O device is transferred and from which data is transferred to a given I/O device. In this main storage device are contained a plurality of addressable data locations for the data being handled. A plurality of registers settable to indicate a byte (8 bits) of data, are contained in the CPU to provide address selection of indicated byte locations in said storage device; temporary single byte status devices to indicate conditions within the machine and control subsequent operations and temporary storage buffers to register data bytes prior to, or during, or after a manipulation of this data within some arithmetical, logical or input-output operation. In addition to these features, the central processing unit of the present invention includes a "read-only" storage. This storage contains a very large number of 60 bit micro-instruction words permanently contained therein which may be repeatedly read out and used to control the CPU.

Instructions and data are contained in said main storage area and from these instructions, the machine is controlled to manipulate data to accomplish all these functions for which the data processing machine is designed.

In operation, instructions are read out from said main storage device in a series of instruction cycles and the data in the instruction word stored in the various registers contained in the machine as indicated by the operation to be performed.

The first 8-bit byte of each instruction word is the Operation Code. This Operation Code is stored in a register which subsequently controls the selection of the next micro-instruction words to distribute data and to perform the calculations, establish conditions, and control logical operations required when the instruction word is fully loaded. In the last few instruction cycles in the read-out of the instruction word from the main memory, the bits contained in the Operation Code select a particular portion of the Read-Only storage which will control the machine for the manipulation of data as directed by the instruction word just loaded into the hardware registers of the machine.

In essence, therefore, the central processing unit of the present invention unit contains the apparatus as specified above, controlled by a series of micro-instruction words which dictate the structural configuration of the machine in every cycle of its operation. The macro or main instruction stream dictates the operational functions to be performed by the machine. In application Ser. No. 357,372, filed Apr. 6 1944, is shown and described such a machine.

In the instance of an I/O instruction, the central processor has the capability of four operations: Start I/O, Test I/O, Halt I/O, and Test Channel.

To initiate an I/O operation, a start I/O instruction is used which establishes the address of the channel and peripheral unit. Besides this, the central processor supplies the channel with operation information located in main storage called the channel command word. The channel command word consists of the specific command to be executed by a peripheral unit, the number of bytes involved in the data transfer, the main storage locations involved in the data transfer, and flags that modify the basic command. The channel issues a command to a control unit associated with a desired I/O device. The control unit in turn selects and mechanically starts the device.

In this present application, the details of selecting an I/O device will not be discussed specifically since the invention per se is not directed to that facet of the apparatus and the same is described in application Ser. No. 357,361, filed Apr. 6, 1964.

However, in order that an understanding may be had of the general over-all operation, the I/O instruction format is:

Op. Code Ignored B2 D2

B2+D2=I/O Unit

Op Code: An eight-bit field giving the operation code of the instruction as follows:

| | | |
|---|---|---|
| 10011100 | (9C) | Start I/O |
| 10011101 | (9D) | Test I/O |
| 10011110 | (9E) | Halt I/O |
| 10011111 | (9F) | Test Channel |

The contents of the general purpose register designated by B2 is added to the value of D2. This forms the channel and unit address.

During the readout of a start I/O instruction, the processor recognizes the instruction as such and branches to the I/O routine (micro-instruction). This routine reads out from storage two control words to be discussed hereinafter, CAW (command address word) and CCW (channel command word). The start I/O instruction is utilized to select the peripheral device and initiate operation therein.

The CAW is a 32-bit word stored in the fixed location

72–75 in main memory. The CAW has the following format:

I/O protection tag Zeros CCW Address

The address contained in the CAW is the address in main storage of the first CCW to be used in an I/O operation. This CCW is a 64-bit word and specifies the operation to be performed.

The information contained in the CCW defines:

(1) The operation to be performed.

(2) The main-storage area to be used.

(3) The action to be taken upon completion of the operation.

(4) The number of bytes involved in the data transfer.

The format of the CCW is:

Command Data Flags Zeros
Ignored Count Code Address

Insofar as the present invention is concerned, there are two portions of the CCW which are pertinent and these are as follows:

*Data address.*—These bits specify the location of an eight-bit byte in main storage. It is the first location referred to in the area defined by the CCW. The location is the starting address from which data is to be fetched or the starting address of the locations where data is to be stored.

*Count.*—This field defines the number of byte storage locations in the area defined by the CCW. The count in conjunction with the data address specifies the complete storage area used by the current CCW.

In describing the present invention, it will be assumed that the I/O instruction has been read from storage and the I/O device selected with the data in the CCW respecting the data address and count now being read into appropriate registers. Details of these control lines and functions and the selection process will be found in application Ser. No. 357,383, filed Apr. 6, 1964.

The schematic illustration of FIG. 1 shows a main storage 10 for the data processor with an address register 11 for selecting a storage location within said storage to read data therefrom through sense amplifiers (not shown) onto a data bus 14 containing as many circuits as the bits in the data byte.

The data of the count from the CCW is read from storage 10 to the register 16 which consists of a number of storage devices (triggers, latches, etc., for temporarily manifesting the data). From the register 16 the data is transferred over a data bus 18 to an AND circuit 20. Under control of a micro-instruction applied to an OR circuit 22, data contained in register 16 is transferred through an OR circuit 24, data bus 26, and modifier 28, data bus 30, and AND circuit 32 to a data address register 34.

The modifier of conventional configuration is controlled to transfer data without modification, i.e., "0," or to add "1" or subtract "1." The controls have not been shown but the "0" modification is applied in this loading process of the channel apparatus. The "0" modification prevails when neither the +1 nor the −1 modification is activated. In later description of the channel apparatus, the modifier is described as adding or subtracting "1." These controls are rendered operational in accordance with the requirements of the data transfer. There has been considered to be no necessity to do more than indicate controls of this nature since, within the data processing art, examples of these basic logical components can be found.

Transfer of data into register 34 is effected by processor timing pulse T3 applied through OR circuit 36 which conditions AND circuit 32. This pulse at T3 time is applied together with the output of OR circuit 22 to AND circuit 38.

In the description of the present invention there will be references to timing pulses T1–T4 which are four timing pulses utilized in a read cycle of storage or a write cycle.

Data read into data address register 34 at T3 time (with associated ROS control generated by the micro-instruction) is retained in the register and stored by setting bistable elements which may be latches, triggers, etc. On the next succeeding time interval, the data in register 34 (indicative of the count) is transferred through an AND circuit 38, by data bus 36 to a register 40. This time control is effected by an AND circuit 42 which is conditioned by inputs at T4 time and a control from the micro-instruction control of the processor. This output from AND 42 is applied through OR circuit 44 to the AND circuit 38. While the count data may comprise more than one byte (eight bits), it is here assumed that there is only a single byte although it is quite apparent that whether one byte or more than one byte is transferred is solely a question of providing appropriate switches for setting into the register at the proper position of each individual byte.

The data address in storage 10 to which or from which data from the peripheral device 13 will be transferred is next transferred from storage 10 through register 16, data bus 18, AND circuit 20, OR circuit 24, data bus 26, modifier 28 ("0" modification), data bus 30, AND circuit 32 to Data Address register 34. The instruction from the processor is now terminated and the channel is now prepared to run independently and request cycles from the processor only when required to transfer data. Thus the processor including storage 10 and address register 11 is performing operations without maintaining control over the channel.

The peripheral device 13, as mentioned previously, has been selected and connected to the data channel by the start I/O instruction. It should be understood that the peripheral device 13 is only of many that are connected to data bus 48 and 50. Similarly, there are a plurality of control lines, such as Service IN line 52, connected to each peripheral unit which establish the connection from the channel to an I/O device specified in the start I/O instruction. The patent application, Ser. No. 357,383, filed Apr. 6, 1964, sets forth these circuit details with great particularity.

When the peripheral device 13 is ready to transmit or receive data to or from the processor, a signal is applied to line 52 which is applied to an AND circuit 54. If the conditions indicated as applied to AND circuit 54 have been fulfilled, a signal is generated to condition an AND circuit 56 which gates data (if the data transfer is into the processor) on bus-in 50 into register 16. The conditions for enabling AND circuit 54 are as indicated—an input condition, the register 16, not full, the count ready and not zero and the fact that it is not a write cycle. Each of these conditions is determined by appropriate bistable sensing devices (not shown) which apply the appropriate signals to the required circuits to establish predetermined conditions for data transfer. As in all logic apparatus, there are requirements that operations be made unequivocally and this can only be achieved by sensing and storing conditions in many areas of the entire logical combination. For example: the fact that the operation is an input operation is established by detecting the initial instruction; the fact that register 16 is empty (so that there will be no mutilation in data transfer) is determined by a bistable element (latch) which is reset when the preceding data byte, if any, has been placed in storage, and is set when a new byte is placed in register 16; so there will be no data transfer when the count in register 40 is zero, the count when transferred through modifier 28 (to be subsequently described) is sensed, and if not zero, a bistable element is set and its outputs applied where required.

With the Service IN line 52 having a signal applied thereto to indicate a request for service, and AND circuit 56 (FIG. 2) is conditioned to generate an output "share request" on line 58 and applies the same to an AND circut 60. The AND circuit 60 provides an output on two further conditions, "not channel 1 write cycle," which establishes that the channel is not then in the process of a write cycle, and "not multiplex share request," which involves priorities between channels to be subsequently described.

Figure 5:
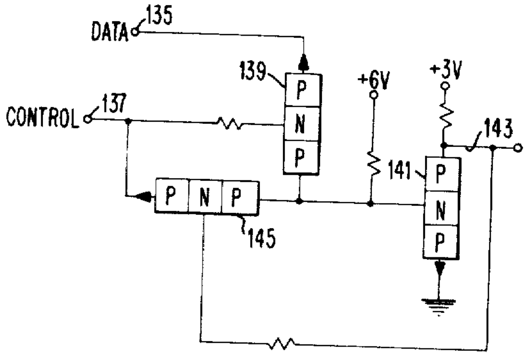
FIG. 5 is a circuit diagram of a storage latch.
Figure 4:
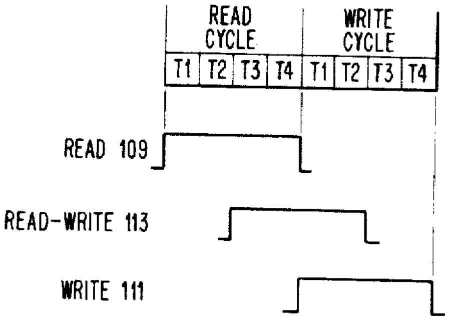
FIG. 4 is a timing pulse diagram of the apparatus of FIG. 3.

If the conditions are satisfied, then a signal is applied to a latch circuit 64 to set the same at CPU time T3. The latch circuit is set by an input and a sample pulse and reset by a sample pulse alone. The circuit configuration of the same is shown in FIG. 5 and will be described hereinafter. The output of the latch 64 is provided to a line 66 "share cycle" for channel 1 which is one of two channels as described in the present application which must be separately controlled. The output 66 is transferred through an OR circuit 68 to set a Share Hold Latch 70. This latch is a conventional set/reset bistable device being unlike latches 64 and 65. The output 72 of latch 70 is directed to the central processing unit to stop the "clock" or timing pulse generator 73 therein immediately after the then occurring machine cycle. Thus, immediately in the time following a processor cycle then in progress, the channel apparatus brings the processor to a stopped condition in that the program then being performed is temporarily discontinued (i.e., no instructions are being read, no operations are being performed, etc.). This same output 72 is provided to a selector channel time pulse generator 74 which is enabled to run for two cycles and generate two sets of timing pulses for the read and write cycles (i.e., Read T1, T2, T3, T4, Write T1, T2, T3, T4) as shown in FIG. 4.

Figure 3:
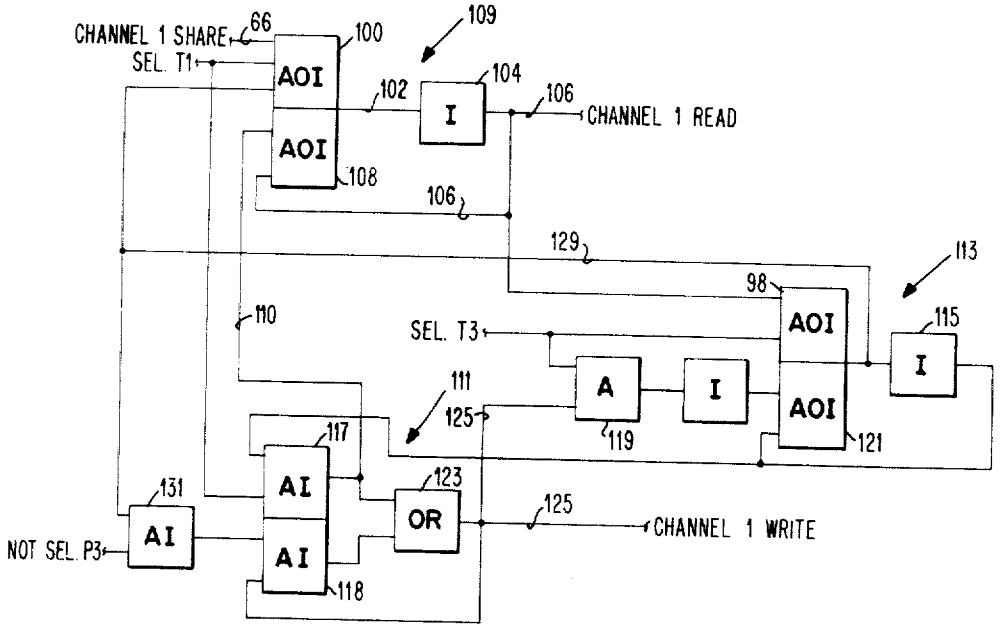
FIG. 3 is a circuit diagram of apparatus for effecting a read/write cycle.

The circuit for providing two cycles of operation is described in FIG. 3 and will be described hereinafter.

In the input/output apparatus associated with the present processor, there are two channels as are presently being described and a multiplexor channel which is a slower speed channel for handling many peripheral devices by periodic sampling. In operation of any given channel to gain access to the processor, there are questions of priority which have been resolved so that the present described channel gains access to the process 50% of the time, a second channel (#2) gains access 25% of the time, and the multiplex channel gains access 25% of the time. This is, of course, where all three request service at the same time. Where there is no simultaneous request, each channel gains immediate access.

Figure 2:
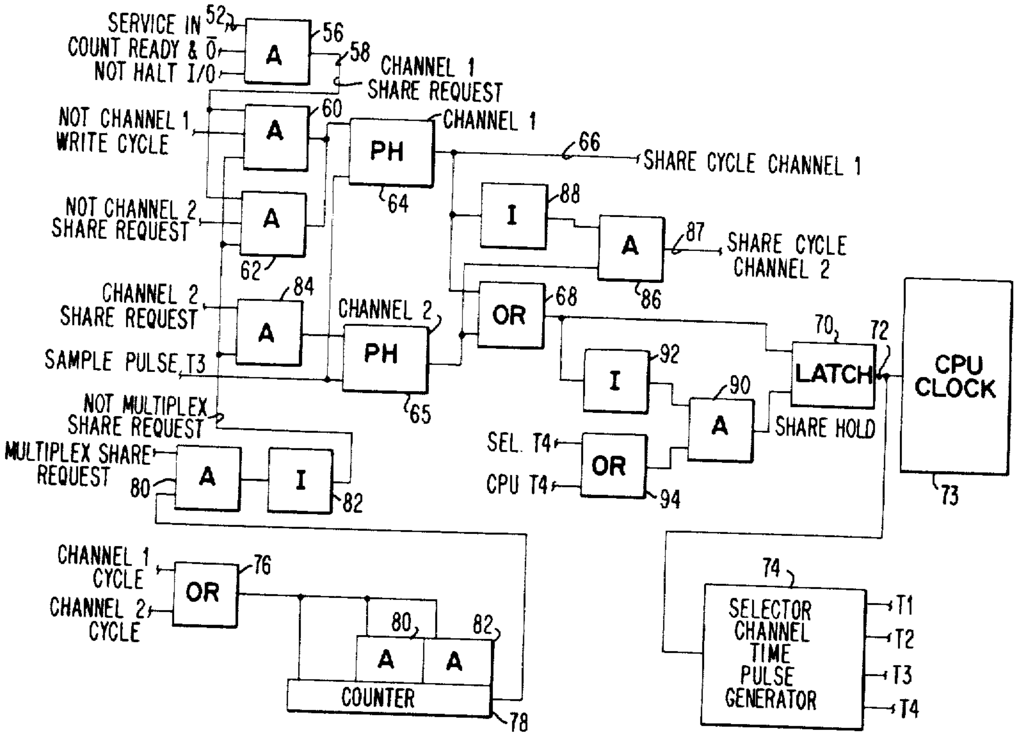
FIG. 2 is a detailed circuit diagram of a portion of the data channel.

To effect this operation, apparatus is provided as in FIG. 2. For each channel 1and 2 share cycle, as an output 66 for channel 1, for example, a signal is transferred through an OR circuit 76 to all (three) stages of a counter 78 but where stage 2 and stage 3 have interposed in this circuit AND circuits 80 and 82, which are conditioned with the output from OR circuit 76, and with the ON output of the immediately preceding stage. Counter 78 thus counts three input pulses from OR circuit 76 after which it applies the ON output to an AND circuit 80 which is conditioned by a multiplexor channel share request.

As described previously, with respect to the initial channel 1 request for service, an input 52 (FIG. 1 and FIG. 2), it was necessary that the AND circuit 60 be enabled. One of the inputs to this AND circuit is the "NOT" input of AND circuit 80 provided by means of an inverter 82. Thus, for channel 1 to gain access to the control function, it was necessary that there not be a multiplex channel request entitled to priority. In explanation, it can be seen that until counter 78 has reached the count of three, the AND circuit cannot be enabled, but thereafter one input of AND 80 is raised by output of the counter 78. This allows the two channels (1 and 2) three requests to each one of the multiplex channel.

In determining priority between channel 1 and channel 2, further circuitry is provided so that a request from channel 2 to an AND circuit 84 would provide an output to set the channel latch 65 which provides an output to an AND circuit 86 which is enabled by the "NOT" output of the share cycle channel 1 output 66, established through an inverter 88. Thus, in the instance of a simultaneous channel 1 request and channel 2 request, the channel 1 request will prevail. Immediately following this channel 1 service, however, the channel 2 latch will gain control when the latch 64 is dropped at T3 time when there is no input from AND circuits 60 or 62 while latch 65 is set to control the circuit for channel 2.

The share hold latch 70 is reset by the output of an AND circuit 90 which is enabled when neither the channel 1 latch nor the channel 2 latch is ON and providing an output to an inverter 92 and the OR circuit 94 transfers a timing pulse at T4 time of either the channel clock or central processor clock thereto.

The latch circuit of FIG. 5 operates to a set condition when data is presented at input 135 and a control pulse is presented at 137. The signal levels at 135 are made negative with respect to the level at 137 to operate the latch. The transistor 139 is biased so that the collector drops to the level of the data input at 135 (substantially) which biases a transistor 141 to provide substantially +3 v. potential at its collector output 143. This output is applied to the base of transistor 145 which, when the control pulse 137 drops, substantial conduction in transistor 145, and the lowered potential at the collector applied to the base of transistor 141 holds the latch on. When the next control pulse at 137 rises, the latch 145 is biased toward non-conduction which biases 141 toward conduction which drops the output 143, provided there is not an input (negative level) at data input 135.

As mentioned previously, there is a read cycle and a write cycle of the clock or time pulse generator 74. The output timing pulses are therefore two series of pulses T1–T4 each time a share cycle output is provided on output 66 or 87, FIG. 2, which is controlled by a circuit as shown in FIG. 3 for each channel. FIG. 3 illustrates the apparatus for channel 1. The time relationship is shown particularly in FIG. 4.

With a channel 1 share output present at 66 and at time T1 of the selector channel clock 74 and the read-write latch 113 in its OFF condition (129 raised), an AND circuit 100 provides a lowered output at 102 to inverter 104 which by its output at 106 to AND circuit 108 with a raised output 110 from write latch 111 sets the combination of elements 100, 108, and 104 to provide an output at 106 so long as a write latch 111 is off. The circuits 100, 108 together form a so-called AND-OR-Invert block whose output is down when either of the AND inputs is satisfied.

The output from read latch 109 is coupled to AND-OR-Invert circuit 98 and at time T3 is enabled to provide an output (inverted) which disables AND 100 and through inverter 115 provides a raised output to AND invert circuit 117 in write latch 111. At time T1 of the write cycle, the AND-Invert circuit 117 is conditioned and by its inverted output at 110 drops the read latch circuit 109 and the output 106.

When the write latch 111 is set, the output 125 rises to condition AND circuit 119. At time T3, the AND circuit 119 is enabled and by an inverter drops the input to the AND-OR-Invert circuit 121 which drops the read/write latch 113. The off output of this latch 129 conditions one leg of the AND-Invert Circuit 131. At time NOT P3, the AND-Invert circuit 131 is activated and the write latch 111 drops out. The timing pulse P3 (not shown specifically but originating from the timing pulse generator) rises at T3 and falls at the end of T4.

Referring to FIG. 1 and with the timing pulse generator of FIG. 2 initiated into operation with data contained in register 16, the data address contained in register 34 is transferred into the address register 11 through AND circuit 17 conditioned by the output from an AND circuit 19 which is enabled at time T1 during a read cycle of the selector clock. The data address when transferred into the address register 11 reads from the designated address location any data character contained therein, to the register 16 for subsequent transfer through register 23 to the peripheral unit 13.

If data is to be transferred from unit 13 to storage 10, the address register selects the address location and conditions the storage 10 to accept data from register 16 through the bus in (inhibit lines) during the write cycle of storage 10 which it will be remembered is controlled by the channel clock of FIG. 2.

At the time that the address is being transferred to register 11, the count in register 40 is transferred through AND circuit 41, OR circuit 24, modifier 28 (which subtracts 1), AND circuit 32 (enabled at selector channel clock time T4) to the address register 34. On the write cycle of the selector clock at time T1, the AND circuit 45 is enabled to enable AND circuit 38 to transfer the data count in address register 34 back into the count register 40.

The data address in the address register 11 is gated through AND circuit 29 during the write cycle, OR circuit 24, modifier 28 (adding 1 to the address) through AND circuit enabled at T4 time to address register 34.

The channel clock now has run through its read and write cycle to control the transfer of data through the channel and into main storage 10. The control for stopping the clock of the CPU is now disabled and the CPU clock resumes processing with the address register being used for its normal functions until another request is made on the Service In line 52.

While the invention has been particularly shown and described with reference to a preferred embodiment thereof, it will be understood by those skilled in the art that various changes in form and details may be made therein without departing from the spirit and scope of the invention.

What is claimed is:

1. In an apparatus for transferring data between a peripheral data unit and a central processing unit:

(a) a data storage device containing a plurality of addressable locations wherein each location contains means for storing a data character as a combination of bit manifestations and being responsive to the selection of said address, for transferring therefrom any data character therein during a read timing cycle and receiving any data character presented during a write timing cycle;

(b) a principal address register for manifesting address data of the addressable locations within said storage device;

(c) means for connecting said address register to said storage device to select an address location within said storage device;

(d) time pulse generating means for generating a read cycle pulse and a write cycle pulse for application to said storage means to enable the transfer of data at predetermined times within said read and write cycles;

(e) means responsive to the operation of said peripheral data unit to provide a signal indicative that said peripheral unit is conditioned for a data transfer;

(f) data transfer means;

(g) storage means settable by said signal (e) to disable said time pulse generating means (d);

(h) second time pulse generating means for generating a read cycle pulse and a write cycle pulse for application to said storage means and said data transfer means to enable the transfer of data from said peripheral unit to said data storage device;

(i) and means responsive to the termination of said read-write cycle for resetting said storage means (g).

2. The apparatus of claim 1 wherein said data transfer means includes:

(a) a peripheral data address register into which address data is transferred indicative of addresses within said storage facility between which a data transfer will occur;

(b) means for transferring address data from said storage facility to said peripheral data address register when said peripheral unit is selected;

(c) and means for connecting said time pulse generating means to enable said data transfer at said required time.

3. The apparatus of claim 2 further including means responsive to the signal from said peripheral unit and said second time pulse generating means for transferring said data contained in said peripheral address register into said principal address register to select the location between which data is to be transferred.

4. The apparatus of claim 3 wherein said storage means (g of claim 1) is reset at the termination of said write cycle of said second time pulse generating means wherein said first time pulse generating means is enabled.

5. The apparatus of claim 3 further including:

(a) a count register into which count data is transferred indicative of the quantity of data to be transferred;

(b) means for transferring count data from said storage facility to said count register when said peripheral unit it selected;

(c) and means for transferring said count data to said peripheral data address register after address data therein is transferred to said principal address register.

6. The apparatus of claim 5 further including:

(a) a modifier circuit for affecting data transferred through said modifier;

(b) means for transferring said peripheral address data contained in said principal address register through said modifier to said peripheral address register to modify the address to indicate the next successive location in storage between which data is to be transferred.

References Cited

UNITED STATES PATENTS

| | | | |
|---|---|---|---|
| 3,131,377 | 4/1964 | Grondin | 340—172.5 |
| 3,193,800 | 7/1965 | Shoultes | 340—172.5 |
| 3,248,701 | 4/1966 | Eisenstein | 340—172.5 |

PAUL J. HENON, *Primary Examiner.*

RAULFE B. ZACHE, *Assistant Examiner.*